United States Patent
Faber et al.

(10) Patent No.: US 11,586,644 B2
(45) Date of Patent: Feb. 21, 2023

(54) SYSTEM AND METHODS FOR CREATING, DISTRIBUTING, ANALYZING AND OPTIMIZING DATA-DRIVEN SIGNALS

(71) Applicant: Worthy Technology LLC, Austin, TX (US)

(72) Inventors: Ryan Faber, Westport, CT (US); Robert Maciej Pieta, Glenview, IL (US); David Samuel Raphael, Brooklyn, NY (US)

(73) Assignee: Worthy Technology LLC, Austin, TX (US)

( * ) Notice: Subject to any disclaimer, the term of this patent is extended or adjusted under 35 U.S.C. 154(b) by 101 days.

(21) Appl. No.: 17/308,022

(22) Filed: May 4, 2021

(65) Prior Publication Data
US 2021/0349909 A1 Nov. 11, 2021

Related U.S. Application Data

(60) Provisional application No. 63/022,110, filed on May 8, 2020.

(51) Int. Cl.
*G06F 16/00* (2019.01)
*G06F 16/25* (2019.01)
*G06F 16/26* (2019.01)
*G06F 16/215* (2019.01)
*G06F 16/23* (2019.01)
*G06F 16/2458* (2019.01)

(52) U.S. Cl.
CPC .......... *G06F 16/252* (2019.01); *G06F 16/215* (2019.01); *G06F 16/2322* (2019.01); *G06F 16/2477* (2019.01); *G06F 16/26* (2019.01); *G06F 2216/03* (2013.01)

(58) Field of Classification Search
CPC .................................. G06F 16/25; G06F 16/26
See application file for complete search history.

(56) References Cited

U.S. PATENT DOCUMENTS

| | | | |
|---|---|---|---|
| 2012/0324456 A1* | 12/2012 | Teather ................ | G06F 9/4843 718/102 |
| 2017/0235611 A1* | 8/2017 | Anderson ............. | H04L 9/3247 718/104 |
| 2021/0194725 A1* | 6/2021 | Pfister ................. | H04L 12/46 |

OTHER PUBLICATIONS

Thams et al., "Efficient Database Generation for Data-Driven Security Assessment of Power Systems," IEEE Transactions on Power Systems, vol. 35, No. 1, Jan. 2020, pp. 30-41. (Year: 2020).*

* cited by examiner

*Primary Examiner* — Cheryl Lewis
(74) *Attorney, Agent, or Firm* — Bochner IP, PLLC; Andrew D. Bochner

(57) ABSTRACT

Provided for herein may be a system for optimizing data-driven signals, comprising a database subsystem configured to retrieve rich time-series data, a signal scheduler subsystem configured to trigger a signal generator subsystem time interval, a data aggregator subsystem configured to retrieve and process data from the database subsystem, a signal generator subsystem configured to create a data-driven signal from data aggregated by the data aggregated subsystem, a signal sender subsystem configured to send object data, a data downloader subsystem; and a data analyzer subsystem configured to analyze and provide analysis on data in the database subsystem.

21 Claims, 3 Drawing Sheets

SYSTEM AND METHODS FOR CREATING, DISTRIBUTING, ANALYZING AND OPTIMIZING DATA-DRIVEN SIGNALS

CLAIM OF PRIORITY

This application claims priority from U.S. Provisional Patent Application No. 63/022,110, filed on May 8, 2020, the contents of which are incorporated herein by reference.

FIELD OF THE INVENTION

This disclosure relates to a system and methods for creating data-driven signals. Specifically, this disclosure relates to a system and methods for creating, distributing, analyzing, and optimizing data-driven signals.

BACKGROUND

Current technologies capture an ever-increasing amount of data. Indeed, current hardware needs worldwide are increasing, as all types of data captured grows exponentially.

The growth of personalized software and recommendation engines can be attributed to increased data access. As technology is ever-present, data is constantly generated in increasing magnitude. Not only is the sheer amount of data expanding, but the number and types of devices and systems generating and recording such data has expanded. For example, hardware devices, mobile applications, webpages, servers, cloud systems, sensors, switches, and routers all generate significant data.

Various forms of data may be used. For example, time-series data, which is data shown, utilized or otherwise indexed as a series of points over time. Thus, specific data may be associated with a point in time. Time-series data is often important for viewing and analyzing patterns over time, forecasting future results or events, and analyzing whether other patterns exist.

A subset of time series data, rich time-series data, often provides the visual and forecasting advantages of time-series data, but with additional datapoints. That is, rich time-series data contains a data object identifier, as well as a time stamp.

Rich time-series data is critical for software systems, and for large scale data processing and analysis. Indeed, as an enhanced form of time-series data, rich time-series data provides essential datapoints for measuring changes over time, predicting all sorts of future events, whether it be weather, financial markets, pandemics, health, self-driving vehicles, retail, crime and safety, defense and a host of other industries.

Various industries rely on rich time-series data to create signals informing analysis of the past, as well as current and future decision-making. For example, marketing industries analyze user behavior for the creation of one or more signals. The signals then determine the likelihood that a product user would rate a certain product highly, or hold it in high regard. A subset of signals, data-driven signals, are often used to assess value and drive behavior.

While some solutions exist to create, evaluate or distribute data-driven signals, no solutions do so in a vertically-integrated system.

It would be desirable, therefore, to provide comprehensive systems and methods for creating, distributing, analyzing and optimizing data-driven signals. It would be further desirable to provide a vertically integrated data-driven signal system, enabling the creation of more accurate signals through faster optimization.

SUMMARY OF THE INVENTION

The invention of the present disclosure may be a system for optimizing data-driven signals, comprising a database subsystem configured to retrieve rich time-series data, a signal scheduler subsystem configured to trigger a signal generator subsystem time interval, a data aggregator subsystem configured to retrieve and process data from the database subsystem, a signal generator subsystem configured to create a data-driven signal from data aggregated by the data aggregated subsystem, a signal sender subsystem configured to send object data, a data downloader subsystem, and a data analyzer subsystem configured to analyze and provide analysis on data in the database subsystem.

In an embodiment, the data is JSON-encoded object data, XML-encoded object data, query parameter encoded object data, or byte-encoded object data. The data may also be transmitted via a TCP/IP protocol, FTP, or other protocol for data transmission. In an embodiment, the database system correlates data object identifiers based on additional data associated with rich time-series datapoints. The data processor subsystem may be configured to scrub data by removing unwanted data attributes. In another embodiment, the data processor subsystem is configured to add data by inserting new data attributes. The rich time-series data may be comprised of one or more rich time series datapoints, the datapoints comprising at least one data object identifier and/or at least one timestamp. The datapoint may also comprise additional data, including one or more keys and associated values.

In an embodiment, the analysis of the data in the database system may be used to improve the signal generator subsystem. In an embodiment, third-party integrators may also utilize the signal scheduler subsystem. In an embodiment, the data analyzer subsystem is further configured to display one or more results, by-products, visualizations, tables, raw data, computed or derived data, real-time or historical data, or data via a graphical user interface. The data may be transmitted with request authentication. Further, the database subsystem may be hosted on a cloud server.

In an embodiment, a human may use the data in the database system to develop a data-driven signal using a graphical user interface, where the created data-driven signal is added to the signal generator subsystem.

In an embodiment, the signal scheduler subsystem is implemented as a database hook. The signal scheduler subsystem may also be utilized as middleware. In an embodiment, the signal sender subsystem is configured to encode the at least one data object identifier with the data-driven signal. The data downloader subsystem may be configured to obtain data from a third-party integrator and/or directly from a third-party.

DETAILED DESCRIPTION OF THE INVENTION

Figure 1:
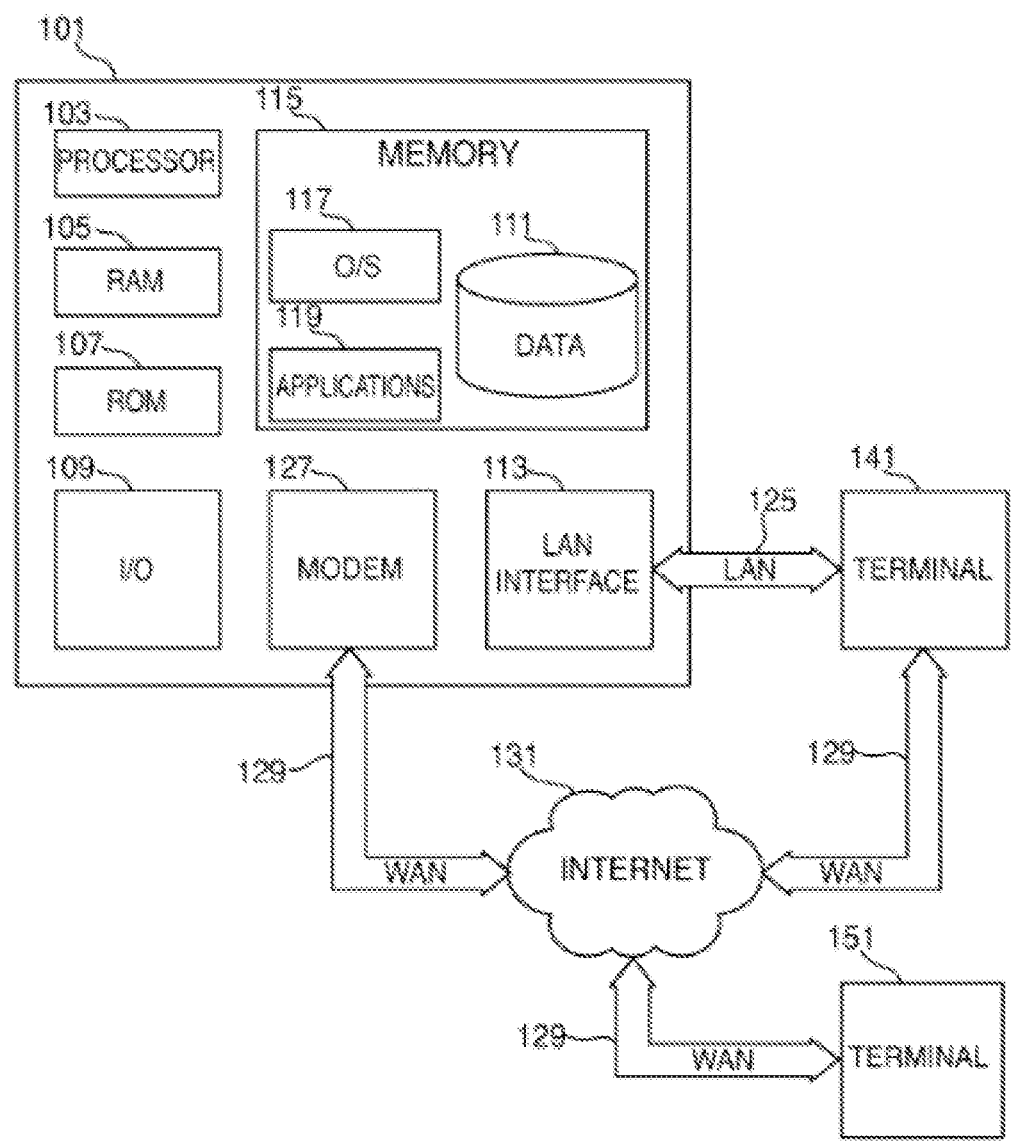
FIG. 1 is an illustrative block diagram of a system based on a computer.

The detailed description provided herein, along with accompanying figures, illustrates one or more embodiments, but is not intended to describe all possible embodiments. The detailed description provides exemplary systems and methods of technologies, but is not meant to be limiting, and similar or equivalent technologies, systems, and/or methods may be realized according to other examples as well.

Those skilled in the art will realize that storage devices utilized to provide computer-readable and computer-executable instructions and data can be distributed over a network. For example, a remote computer or storage device may store computer-readable and computer-executable instructions in the form of software applications and data. A local computer may access the remote computer or storage device via the network and download part or all of a software application or data and may execute any computer-executable instructions. Alternatively, the local computer may download pieces of the software or data as needed, or process the software in a distributive manner by executing some of the instructions at the local computer and some at remote computers and/or devices.

Those skilled in the art will also realize that, by utilizing conventional techniques, all or portions of the software's computer-executable instructions may be carried out by a dedicated electronic circuit such as a digital signal processor ("DSP"), programmable logic array ("PLA"), discrete circuits, and the like. The term "electronic apparatus" may include computing devices or consumer electronic devices comprising any software, firmware or the like, or electronic devices or circuits comprising no software, firmware or the like.

The term "firmware" as used herein typically includes and refers to executable instructions, code, data, applications, programs, program modules, or the like maintained in an electronic device such as a ROM. The term "software" as used herein typically includes and refers to computer-executable instructions, code, data, applications, programs, program modules, firmware, and the like maintained in or on any form or type of computer-readable media that is configured for storing computer-executable instructions or the like in a manner that may be accessible to a computing device.

The terms "computer-readable medium", "computer-readable media", and the like as used herein and in the claims are limited to referring strictly to one or more statutory apparatus, article of manufacture, or the like that is not a signal or carrier wave per se. Thus, computer-readable media, as the term is used herein, is intended to be and must be interpreted as statutory subject matter.

The term "computing device" as used herein and in the claims is limited to referring strictly to one or more statutory apparatus, article of manufacture, or the like that is not a signal or carrier wave per se, such as computing device 101 that encompasses client devices, mobile devices, wearable devices, one or more servers, network services such as an Internet services or corporate network services based on one or more computers, and the like, and/or any combination thereof. Thus, a computing device, as the term is used herein, is also intended to be and must be interpreted as statutory subject matter.

FIG. 1 is an illustrative block diagram of system 100 based on a computer 101. The computer 101 may have a processor 103 for controlling the operation of the device and its associated components, and may include RAM 105, ROM 107, input/output module 109, and a memory 115. The processor 103 will also execute all software running on the computer—e.g., the operating system. Other components commonly used for computers such as EEPROM or Flash memory or any other suitable components may also be part of the computer 101.

The memory 115 may be comprised of any suitable permanent storage technology—e.g., a hard drive. The memory 115 stores software including the operating system 117 any application(s) 119 along with any data 111 needed for the operation of the system 100. Alternatively, some or all of computer executable instructions may be embodied in hardware or firmware (not shown). The computer 101 executes the instructions embodied by the software to perform various functions.

Input/output ("I/O") module may include connectivity to a microphone, keyboard, touch screen, and/or stylus through which a user of computer 101 may provide input, and may also include one or more speakers for providing audio output and a video display device for providing textual, audiovisual and/or graphical output.

System 100 may be connected to other systems via a LAN interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, application program(s) 119, which may be used by computer 101, may include computer executable instructions for invoking user functionality related to communication, such as email, Short Message Service (SMS), and voice input and speech recognition applications.

Computer 101 and/or terminals 141 or 151 may also be devices including various other components, such as a battery, speaker, and antennas (not shown).

Terminal 151 and/or terminal 141 may be portable devices such as a laptop, cell phone, smartphone, smartwatch, or any other suitable device for storing, transmitting and/or transporting relevant information. Terminals 151 and/or terminal 141 may be other devices. These devices may be identical to system 100 or different. The differences may be related to hardware components and/or software components.

Figure 2:
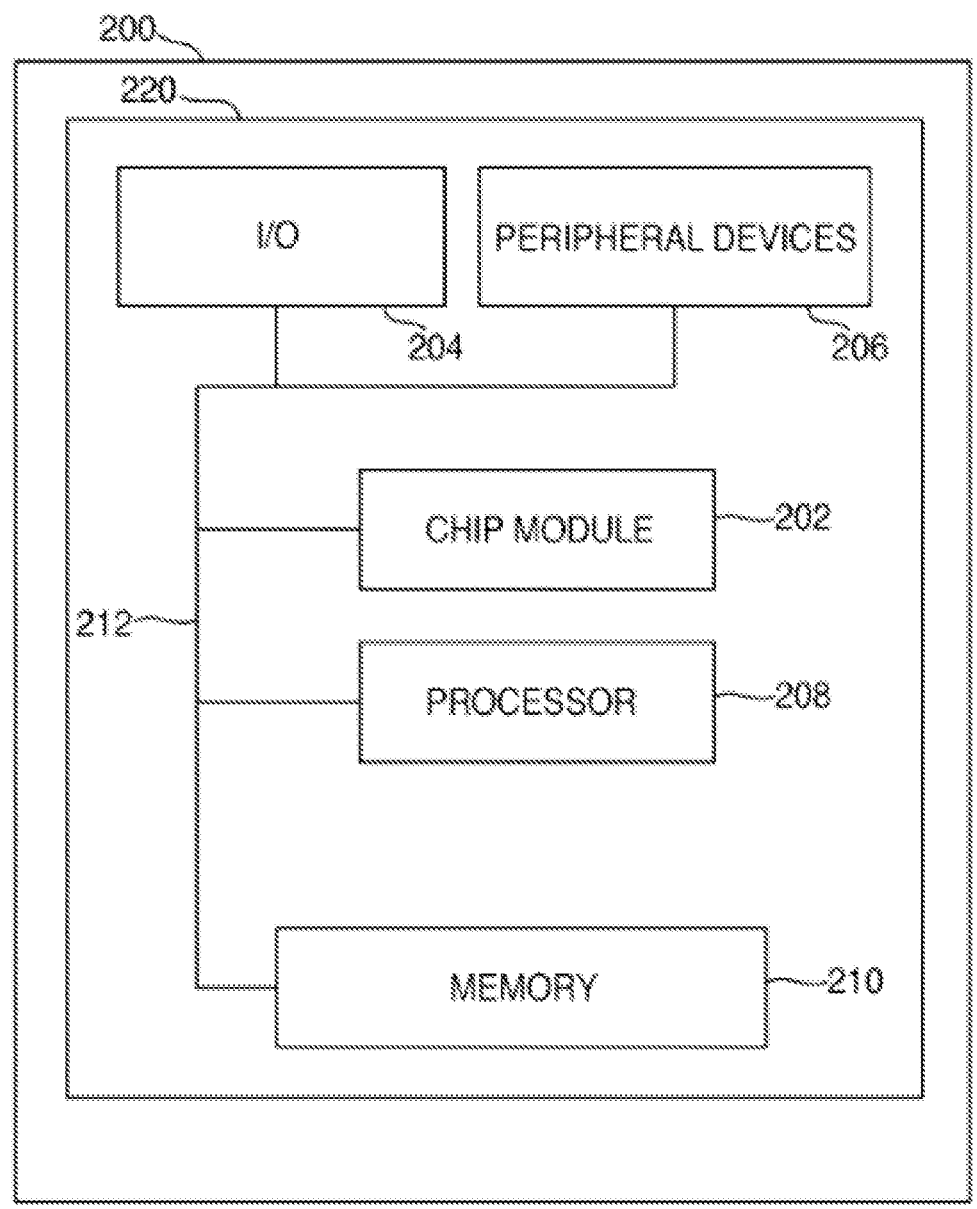
FIG. 2 is an illustration of a computing machine.

FIG. 2 shows illustrative apparatus 200. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable encoded media or devices; peripheral devices 206, which may include counter timers, real-time timers, power-on reset generators or any other suitable peripheral devices; logical processing device 208, which may test submitted information for validity, scrape relevant information, aggregate user financial data and/or provide an auth-determination score(s) and machine-readable memory 210.

Machine-readable memory 210 may be configured to store in machine-readable data structures: information pertaining to a user, information pertaining to an account holder and the accounts which he may hold, the current time, information pertaining to historical user account activity and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Disclosed herein are systems, apparatus and methods ("the system") for creating, distributing, analyzing, and/or optimizing data-driven signals.

In one embodiment, the data-driven signal is given a value. The value may be correlated to an outcome. The outcome may be computed from rich time-series data. For example, the signal may be a binary value, such as 0 or 1. The signal may be a continuous value, an assigned category name, such as "group1," or a data structure, such as ["id.1", "id.2"].

In a further embodiment, the data-driven signal may be made up of multiple sub-signals. Each sub-signal may itself be considered a data-driven signal. Data-driven signals may be calculated using other data in the system database, data from third-parties, data from data-driven signals, and/or any other derived or computed data.

In an embodiment, the system may create, distribute, analyze and/or optimize data-driven signals.

The system may include a database subsystem. The database subsystem may be configured to retrieve or receive rich time-series data.

In accordance with an embodiment, rich time-series data may be comprised of a series of datapoints. Each datapoint may contain at least one data object identifier, and a timestamp. The data object identifier may be a value, such as any suitable value. The value may be a unique value that corresponds to the rich time-series datapoint. For example, "123-123" may be a data object identifier.

The data object identifier may be associated with a plurality of datapoints. For example, the data object identifier may be associated with three datapoints that are related to one another. However, in alternate embodiments, the data object identifier may be associated with any number of datapoints.

The timestamp may be in any suitable format. For example, ISO 8601 format may be used, which may be displayed as "2020-04-22T01:45:35+00:00." Alternatively, any other suitable timestamp format may be utilized. The timestamp may correspond to the time at which the rich time-series datapoint occurred, is received, transmitted, generated, or otherwise processed. In another embodiment, the datapoint may be associated with a plurality of timestamps (for example, one timestamp correlating to the time at with the datapoint occurred and another for when the datapoint was received).

In certain embodiments, a rich time-series datapoint will contain or be associated with additional data. The additional data may be formatted in any suitable way, and may be in addition to the data object identifier and timestamp. Moreover, the additional data may be specifically bundled with, or correspond to, the data object identifier and/or timestamp. For example, a key "platform" and associated value "web" may be used to indicate that the rich time-series datapoint occurred on a web platform.

In certain embodiments, the database system may correlate data object identifiers based on additional data associated with rich time-series datapoints. For example, a datapoint with a data object identifier "ID.A" and an additional data key "device" with an associated value "123" may be used to indicate the data object identifier "ID.A" is associated with device "123". In such an embodiment, the database system may include a comparative database or table configured to correlate a data object identifier and an additional data key with an associated value. The database system may retrieve rich time-series datapoints containing and associated with a data object identifier.

Figure 3:
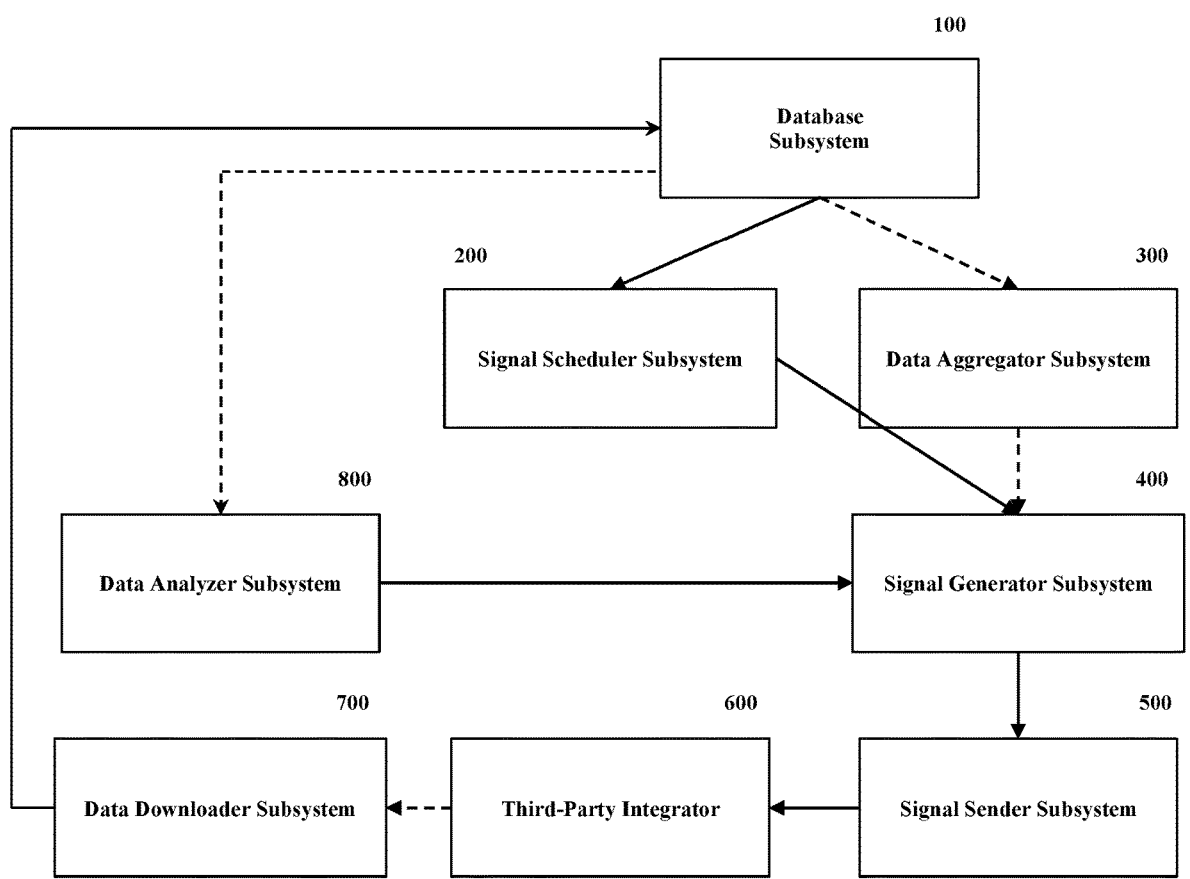
FIG. 3 is an illustration of an exemplary method and process for personalizing content recommendations by creating, transmitting and analyzing data-driven signals.

FIG. 3 illustrates an exemplary method and process for personalizing content recommendations by creating, transmitting and analyzing data-driven signals. However, in various embodiments, the method and process may be utilized for various applications in addition to content personalization.

The system may include a signal scheduler subsystem 200. The signal scheduler subsystem 200 may be configured to trigger a signal generator subsystem 400. In an embodiment the signal generator subsystem 400 may be triggered on a specified time interval, such as, for example, 10 minutes, 40 minutes, or 2 hours. In an alternate embodiment, the signal generator subsystem 400 may be triggered by an event (for example, a reboot of the system, storing new data in the database subsystem 100, or a manual dataset upload by a user).

The system may include a data aggregator subsystem 300. The data aggregator subsystem 300 may be configured to retrieve or process data from the database subsystem 100. In alternate embodiments, the data aggregator subsystem 300 may be configured to retrieve or process data from other sources (for example, directly from a user or from an auxiliary database system).

The system may include a signal generator subsystem 400. The signal generator subsystem 400 may be configured to create a data-driven signal from data. For example, an exemplary data-driven signal may count rich time-series datapoints containing a key "media" and produce a "1" signal if more than 10 datapoints contain the key "media".

In an embodiment, the signal generator subsystem 400 may be configured to generate signals based on human created rules and specification. For example, a human may create a set of rules using a graphical user interface. Those rules may be saved to the database subsystem 100 and the signal generator subsystem 400 may read those rules from the database subsystem 100 to create a signal.

In an embodiment, data may be aggregated by the data-aggregator subsystem 300 where the data and aggregated data may be used by the signal generator subsystem 400.

The system may further include a signal sender subsystem 500. The signal sender subsystem 500 may be configured to transmit JavaScript Object Notation ("JSON")-encoded object data. In an embodiment, the object data may be encoded as XML-encoded object data, query parameter encoded object data, or byte-encoded object data.

The data may be transmitted via a suitable protocol, such as TCP/IP, to an HTTP endpoint, or an HTTPS endpoint. The data may be sent to the HTTPS endpoint if protected by secure sockets layer ("SSL") and transport layer security ("TLS"). In an embodiment, the data may be transmitted with or without request authentication, such as a secret token or OAuth key.

The system may include a data analyzer subsystem 800. The data analyzer subsystem 800 may be configured to analyze and provide analysis of data in the database subsystem 100. The analysis may be utilized to improve the signal generator subsystem 400. As a non-limiting example, the data analyzer subsystem 800 may provide a statistical analysis showing a data-driven signal is not producing a "1" signal often enough. In such an example, the signal generator subsystem 400 could thus be modified to produce a "1" signal more frequently.

In an embodiment, a human may analyze the analysis from the data analyzer subsystem 800 via a graphical user interface. The human may then update a set of rules for the signal generator subsystem 400 based on the analysis using a graphical user interface.

A database subsystem 100 may be configured to store data, including rich time-series data. The data may be stored in SQL, NOSQL, or any other format. The data may be encrypted or unencrypted. In one embodiment, the stored data may be queried and sequentially read.

In one embodiment, the database subsystem 100 may be hosted in the cloud, and associated with an application programming interface ("API"). However, in some embodiments, the database subsystem 100 may be hosted locally or on a server. The API may be used to query stored data using SQL.

In one embodiment, the signal scheduler subsystem 200 may monitor data. The subsystem 200 may determine when to trigger the signal generator subsystem 400. For example, subsystem 200 may be implemented as a database hook, which may be called when new data is saved. The subsystem 200 may perform the following:

```
function save callback (parameter row: DatabaseRow):
    rowkey:=get the database key for the row
    timestamp:=get "time" in row
    type:=get key "type" in row if exists
    if type=="download":
        interval:=2 hours
        triggerTime:=timestamp+interval
        arguments: (rowkey, interval, timestamp)
        trigger SignalGenerator at triggerTime with parameters arguments
```

In an embodiment, the subsystem 200 may perform a function taking in a single argument with a database row representing a rich time-series datapoint. In a non-limiting example, if the "type" key in the database row has a value "download," this function may extract the timestamp associated with the rich time-series datapoint and add two hours to compute a trigger time. In an embodiment, the function then triggers the signal generator providing the database row and trigger time as arguments.

In some embodiments, signal scheduler subsystem 200 may be utilized as middleware. For example, the signal scheduler may run within the database subsystem 100. Thus, subsystem 200 may analyze and modify data before the data is saved in database subsystem 100.

In some embodiments, a third-party integrator 600 may utilize the signal scheduler subsystem 200, for example using an API, to schedule a signal immediately or in the future. In such an embodiment, the signal scheduler subsystem 200 may schedule the kinds of signals, quantity of signals, or may otherwise schedule signals based on any characteristics.

In some embodiments, signal scheduler subsystem 200 may trigger the signal generator subsystem 400 immediately. In an embodiment, the signal scheduler subsystem 200 may trigger the signal generator subsystem 400 on a delay or after a pre-determined period of time (for example, 5 seconds or 2 minutes).

Each time a trigger is scheduled, signal scheduler subsystem 200 may then trigger the signal generator subsystem 400. Subsystem 400 may first obtain aggregated data from the data aggregator subsystem. For example, a data aggregator subsystem 300 may include the following:

```
function aggregate data for (parameter: rowkey, interval, timestamp):
    query:=query the Database for data within interval preceding timestamp
    query:=filter query on query.row.ProductName=rowkey.ProductName
    count:=length of the query results
    return count
```

In an embodiment, the data aggregator subsystem 300 may include a function for computing aggregate data with row key, time interval, and timestamp arguments. In an embodiment, the function may query the database for data within the time interval preceding the timestamp, filtering results for rows where the column "ProductName" has a value equal to the passed in row key "ProductName" value. The function may return the number of results meeting the filter criteria.

The signal generator subsystem 400 may create one or more data-driven signals, based on data aggregated by data aggregator subsystem 300. One or more data-driven signals may be created in a variety of methods. As non-limiting examples, methods include rule-based methods, machine learning methods, statistical methods, or manual inputs. In one embodiment, a non-limiting example signal generator subsystem 400 may generate a signal as follows:

```
function create signal for (parameter: rowkey, interval, timestamp):
    signalGenerator:=get signal generator for rowkey
    count:=aggregate data for (parameter: rowkey, interval, timestamp)
    signal:=1 if count>signalGenerator.cutoff otherwise 0
    return signal
```

In an embodiment, a non-limiting example signal generator subsystem 400 may utilize a function to create a signal taking row key, time interval, and timestamp arguments. In an embodiment, this function first acquires the signal generator associated with the passed in row key. Then this function may call a separate function to aggregate data associated with the passed in row key. In an embodiment, this function returns the value 1 if the resulting value of the aggregated data is greater than a "cutoff" associated with the signal generator, otherwise this function returns the value 0.

Signal generator subsystem 400 may create one or more distinct data-driven signals. This may depend on aggregated data from the data aggregator subsystem 300, or data from the database subsystem 100. For example, if the data aggregator subsystem 300 or database subsystem 100 indicate data is associated with multiple operating system platforms, the signal generator subsystem 400 may create a distinct data-driven signal for each identified platform.

Data-driven signals from the signal generator subsystem 400 may be passed on to the signal sender subsystem 500. Subsystem 500 may be responsible for transmitting data-driven signals to third-party integrators 600. In some embodiments, subsystem 500 may utilize TCP/IP protocols, supported by SSL/TLS security, as well as other security measures, to POST a JSON encoded Data-Driven Signal to third-party integrators 600. However, in alternate embodiments, subsystem 500 may utilize any protocol or security measure.

Signal sender subsystem 500 may encode any other suitable information, such as an API key or data identifier, such as "customer1," with the data-driven signal. This may be done prior to sending the encoded data structure to third-party integrators 600. In another embodiment, this is done as the encoded data structure is sent to the third-party integrators 600. Below is a non-limiting example of an encoded data structure, with 1 being the data-driven signal, in JSON format:

```
{
    "value" : 1,
    "customer" : "customer1"
}
```

In some embodiments, the signal sender subsystem 500 may choose not to send a signal to a third-party integrator 600. As a non-limiting example, this may be the case if the database subsystem 100 indicates the signal sender subsystem 500 has previously sent a signal for a specific user to the third-party integrator 600.

Data downloader subsystem 700 may communicate with third-party integrators 600. The communication may be one-off, or at regular intervals. The communication may be for downloading third-party data, which may be any data. For example, subsystem 700 may utilize TCP/IP protocol supporting TLS/SSL via an API, to obtain JSON-encoded business data for a customer of a third party integrator 600. The business data may be obtained at preset intervals, such as on a daily basis at midnight. In another embodiment, the business data may be obtained at the occurrence of a triggering event (for example, once a business' register is balanced or when a customer makes a purchase). In an alternate embodiment, the communication may be a steady or constant stream of third-party data. In such an embodiment, the third-party data may be communicated to the data downloader subsystem 700 contemporaneously.

In accordance with some embodiments, third-party data need not necessarily enter the data downloader subsystem 700 directly from third-party integrators 600. For example, a user may upload third-party data in JSON encoding to an API Subsystem 100 REST endpoint '/data/upload' using TCP/IP protected by SSL/TLS with a 'Authorization' request header set to 'user 123'. However, a user may upload third-party data in any format or encoding.

The data downloader subsystem 700 may save third-party data in the database subsystem 100. Subsystem 700 may aggregate and organize data in the database subsystem 100 based on properties of third-party data. For example, third-party data may use a "customer" key, indicating the customer of third-party integrator 600 to which the third-party data is related, as part of the database row key. Further, for example, third-party data may be organized and sorted by ascending timestamp associated with each datapoint.

Data analyzer subsystem 800 may obtain performance data related to a data-driven signal. This may be done manually, at regular intervals, constantly, or contemporaneously. The subsystem 800 may perform one or more analyses. In an embodiment where the subsystem 800 performs more than one analyses, subsystem 800 may prioritize certain data based on characteristics of the data.

In an embodiment, performance data may include: any data, including third-party data, stored in the database subsystem 100; third-party data from third-party integrators 600 or other external sources; and any data related to the signal scheduler subsystem 200, data aggregator subsystem 300, and signal generator subsystem 400.

Subsystem 800 may provide an analysis related to optimization of a data-driven signal that has been generated by signal generator subsystem 400. This may be specific to a specific signal generator. For example, subsystem 800 may perform k-means clustering, inference, projection, forecasting, historical aggregation, data mining, stress testing, statistical evaluation, and other mathematical analyses.

An exemplary data analyzer subsystem 800 may perform the following analysis:

```
function analyze signal (parameter: signal, signalGenerator):
    data := query database for Third-Party Data related to the signal
    signalCount := number of signals sent to the Third-Party Integrator
    in 7 days
    mediaCount := get media count from data
    mediaPerDay := mediaCount / total days(retention from data)
    targetEngagement := engagement target in the database
    for this signal
    //Sample optimization using a rule-based method
    if mediaPerDay < targetEngagement:
        signalGenerator.cutoff = 0.95*signalGenerator.cutoff
    otherwise:
        signalGenerator.cutoff = 1.05*signalGenerator.cutoff
```

In an embodiment, an analyze function may take in a signal and signal generator as arguments. In such an embodiment, first, this function queries the database for third-party data related to the signal, the number of signals sent to the third-party integrator in the past seven days, and determines the number of media plays that occurred in the third-party data. In an embodiment, this function then computes the average media per day using the third-party data and acquires a target from the database associated with the passed in signal. In an embodiment, this function returns 0.95 times the cutoff provided by the signal generator if the average media per day is below the target. Otherwise, this function may return 1.05 times the cutoff provided by the signal generator.

Subsystem 800 may, either manually or in an automated fashion, generate additional information related to the data-driven signal. For example, subsystem 800 may produce a ranking of important data features used to derive the data-driven signal by using statistical and machine learning methods to determine feature importance. Conversely, in another non-limiting example, subsystem 800 may produce thresholds for various data features, eliminating or neglecting data that falls below such thresholds. In one example, the data-driven signal may be between 0 and 1 and computed from multiple binary flags, including "is_iphone" and "is_android", which predicts the likelihood of a future event (for example, a media play). Thus, such an analysis by subsystem 800 may conclude that "is_iphone" is more statistically significant to the data-driven signal than "is_android."

Any result or by-product of subsystem 800 may be stored in subsystem 100, displayed to a user via a graphical user interface in one or more graphical visualizations and tables, exported, transmitted to a third-party, and/or used to evaluate or optimize one or more data-driven signals generated by the signal generator subsystem 400.

Data analyzer subsystem 800 may further produce results and information, including but not limited to, charts, graphs, tables, spreadsheets, documents, forecasts, predictions, insights, inferences, rankings, and relationships, which may be used by other parts of the system and communicated to an end-user of the system in a variety of methods, including a website dashboard, text message, and email.

Data analyzer subsystem 800 may further present a graphical user interface to a user to create and optimize one or more data-driven signals to be generated by the signal generator subsystem 400 and saved in the database subsystem 100.

While this invention has been described in conjunction with the embodiments outlined above, many alternatives, modifications and variations will be apparent to those skilled in the art upon reading the foregoing disclosure. Accordingly, the embodiments of the invention, as set forth above, are intended to be illustrative, not limiting. Various changes may be made without departing from the spirit and scope of the invention.

What is claimed is:

1. A system for optimizing data-driven signals, comprising:
    a database subsystem configured to retrieve rich time-series data;
    a signal scheduler subsystem configured to trigger a signal generator subsystem time interval;
    a data aggregator subsystem configured to retrieve and process data from the database subsystem;
    a signal generator subsystem configured to create a data-driven signal from data aggregated by the data aggregated subsystem;
    a signal sender subsystem configured to send object data;
    a data downloader subsystem; and
    a data analyzer subsystem configured to analyze and provide analysis on data in the database subsystem.

2. The system of claim 1, wherein the data is JSON-encoded object data, XML-encoded object data, query parameter encoded object data, or byte-encoded object data.

3. The system of claim 1, wherein the data is transmitted via a TCP/IP protocol, FTP, or other protocol for data transmission.

4. The system of claim 1, wherein the database system correlates data object identifiers based on additional data associated with rich time-series datapoints.

5. The system of claim 4, wherein the datapoint comprises additional data, including one or more keys and associated values.

6. The system of claim 1, wherein the data processor subsystem is configured to scrub data by removing unwanted data attributes.

7. The system of claim 1, wherein the data processor subsystem is configured to add data by inserting new data attributes.

8. The system of claim 1, wherein the rich time-series data is comprised of one or more rich time series datapoints, the datapoints comprising at least one data object identifier.

9. The system of claim 8, wherein the rich time-series data further comprises at least one timestamp.

10. The system of claim 7, wherein the signal sender subsystem is configured to encode the at least one data object identifier with the data-driven signal.

11. The system of claim 1, wherein the analysis of the data in the database system may be used to improve the signal generator subsystem.

12. The system of claim 1, wherein the signal scheduler subsystem may be utilized by third-party integrators.

13. The system of claim 1, wherein the data analyzer subsystem is further configured to display one or more results, by-products, visualizations, tables, raw data, computed or derived data, real-time or historical data, or data via a graphical user interface.

14. The system of claim 1, wherein the data is transmitted with request authentication.

15. The system of claim 1, wherein the database subsystem is hosted on a cloud server.

16. The system of claim 1, wherein the signal scheduler subsystem is implemented as a database hook.

17. The system of claim 1, wherein the signal scheduler subsystem is utilized as middleware.

18. The system of claim 1, wherein the signal generator subsystem is further configured to create a signal based on rules stored in the database subsystem.

19. The system of claim 1, wherein the data downloader subsystem is configured to obtain data from a third-party integrator.

20. The system of claim 1, wherein the data downloader subsystem is configured to obtain data directly from a third-party.

21. The system of claim 1, wherein the data analyzer subsystem is further configured to create and optimize one or more data-driven signals via a graphical user interface and save rules to generate data-driven signals to the database subsystem.

* * * * *